United States Patent
Hsu

(10) Patent No.: US 11,778,291 B2
(45) Date of Patent: Oct. 3, 2023

(54) CIRCUIT BOARD, CAMERA ASSEMBLY HAVING THE CIRCUIT BOARD, AND ELECTRONIC DEVICE HAVING THE CIRCUIT BOARD

(71) Applicant: TRIPLE WIN TECHNOLOGY(SHENZHEN) CO.LTD., Shenzhen (CN)

(72) Inventor: Chia-Weng Hsu, New Taipei (TW)

(73) Assignee: TRIPLE WIN TECHNOLOGY(SHENZHEN) CO.LTD., Shenzhen (CN)

( * ) Notice: Subject to any disclaimer, the term of this patent is extended or adjusted under 35 U.S.C. 154(b) by 168 days.

(21) Appl. No.: 17/512,892

(22) Filed: Oct. 28, 2021

(65) Prior Publication Data
US 2022/0321750 A1    Oct. 6, 2022

(30) Foreign Application Priority Data
Mar. 31, 2021 (CN) .......................... 202110349738.9

(51) Int. Cl.
| | |
|---|---|
| *H04N 23/52* | (2023.01) |
| *G03B 17/55* | (2021.01) |
| *H04N 23/57* | (2023.01) |
| *H04N 23/54* | (2023.01) |
| *H04N 23/55* | (2023.01) |

(52) U.S. Cl.
CPC ............. *H04N 23/52* (2023.01); *G03B 17/55* (2013.01); *H04N 23/57* (2023.01); *H04N 23/54* (2023.01); *H04N 23/55* (2023.01)

(58) Field of Classification Search
CPC ........ H04N 23/52; H04N 23/57; H04N 23/54; H04N 23/55; G03B 17/55; G03B 30/00; H05K 1/0201
See application file for complete search history.

(56) References Cited

U.S. PATENT DOCUMENTS

| | | | |
|---|---|---|---|
| 2021/0127044 A1* | 4/2021 | Shimizu | H04N 23/54 |
| 2022/0159158 A1* | 5/2022 | Smirnov | G02B 7/028 |
| 2022/0404687 A1* | 12/2022 | Lin | G03B 15/05 |

FOREIGN PATENT DOCUMENTS

CN        110636690 B    12/2020

\* cited by examiner

*Primary Examiner* — Mekonnen D Dagnew
(74) *Attorney, Agent, or Firm* — ScienBiziP, P.C.

(57) ABSTRACT

A circuit board includes a circuit substrate, a first solder mask, and a plurality of heat dissipation fins. The circuit substrate includes a first surface. The first solder mask is arranged on the first surface. The plurality of heat dissipation fins are arranged on a surface of the first solder mask facing away from the first surface. A heat dissipation channel is formed between any two adjacent of the plurality of heat dissipation fins. A camera assembly having the circuit board and an electronic device having the circuit board are also provided.

18 Claims, 7 Drawing Sheets

200

CIRCUIT BOARD, CAMERA ASSEMBLY HAVING THE CIRCUIT BOARD, AND ELECTRONIC DEVICE HAVING THE CIRCUIT BOARD

FIELD

The subject matter herein generally relates to a circuit board, a camera assembly having the circuit board, and an electronic device having the circuit board.

BACKGROUND

Design of sizes of electronic devices (such as mobile phones, tablet computers, etc.) are becoming smaller, which requires that the camera modules used in such electronic devices are also miniaturized. Therefore, the area of the circuit board in the camera module may become so small that the high integration density of various electronic components on the circuit board may result in heat being difficult to quickly dissipate, thereby affecting the normal operation of the electronic components in the camera module.

BRIEF DESCRIPTION OF THE DRAWINGS

Implementations of the present disclosure will now be described, by way of embodiments, with reference to the attached figures.

DETAILED DESCRIPTION

Figure 1:
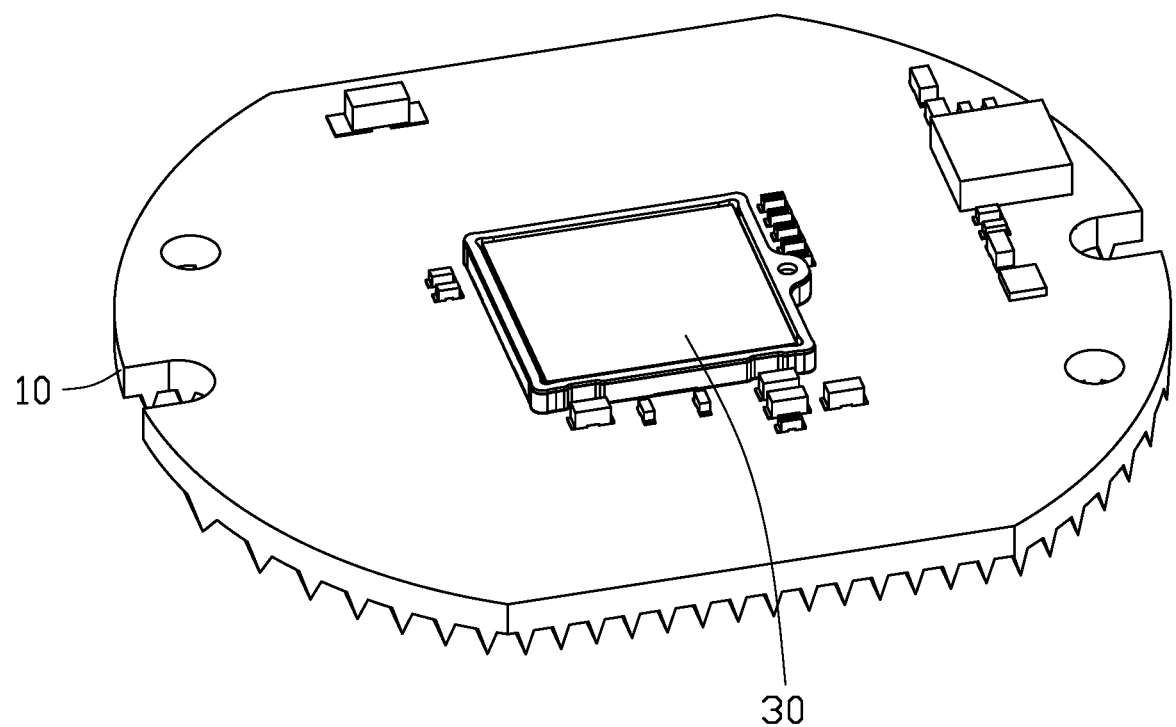
FIG. 1 is a diagram of an embodiment of a circuit board according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to better illustrate details and features of the present disclosure.

The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

The term "comprising," when utilized, means "including, but not necessarily limited to"; it specifically indicates open-ended inclusion or membership in the so-described combination, group, series, and the like.

Figure 2:
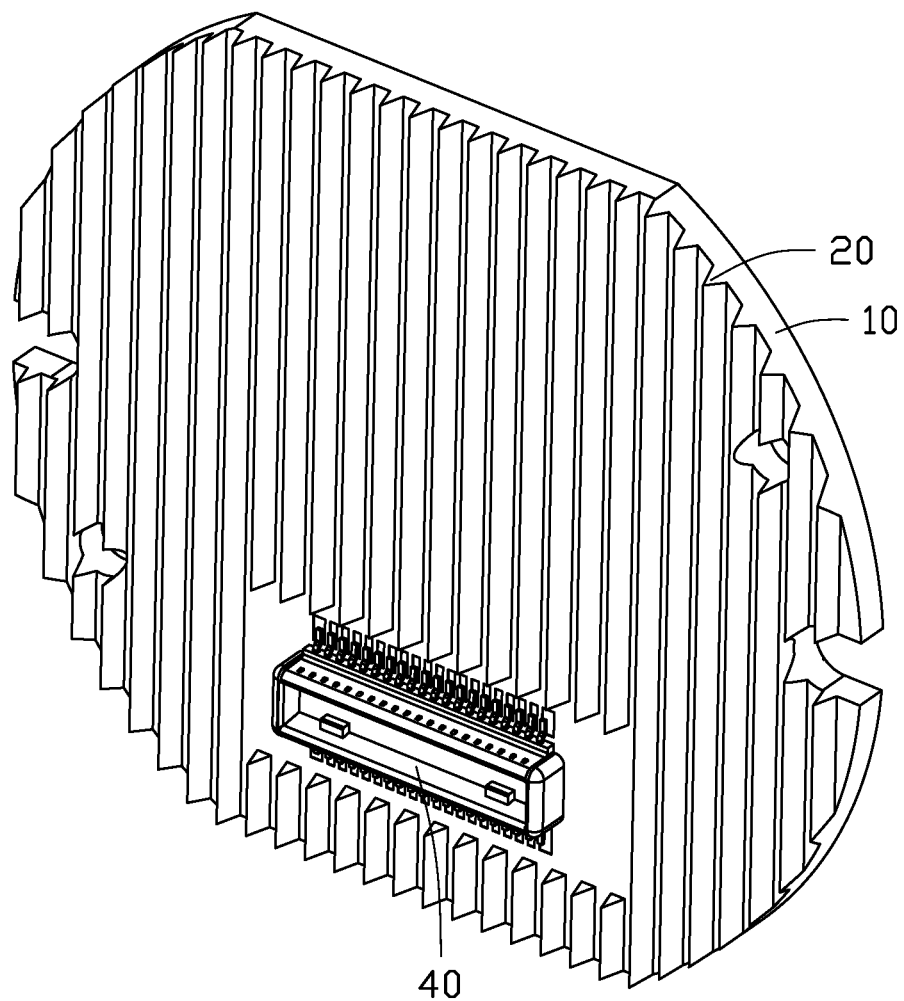
FIG. 2 is a diagram of an embodiment of a circuit board according to the present disclosure.
Figure 3:
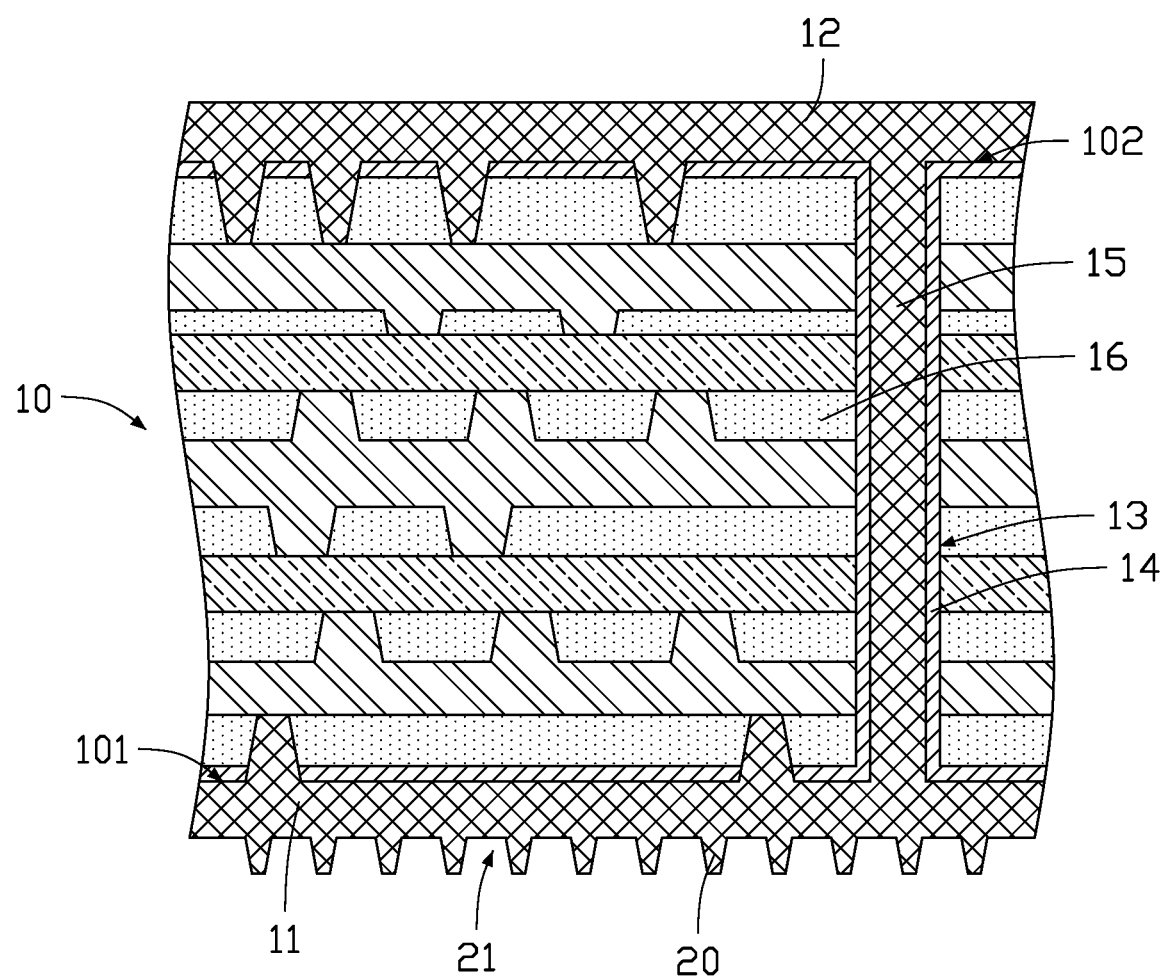
FIG. 3 is a partially cross-sectional view of an embodiment of a circuit board according to the present disclosure.

FIG. 1 illustrates an embodiment of a circuit board 100. Referring to FIGS. 1, 2 and 3, the circuit board 100 includes a circuit substrate 10, a first solder mask 11, a second solder mask 12, at least one heat conducting pillar 15 and a plurality of heat dissipation fins 20. The circuit substrate 10 includes a first surface 101 and a second surface 102 facing away from the first surface 101 and spaced from the first surface 101 along a thickness direction. The first solder mask 11 is formed on the first surface 101, the second solder mask 12 is formed on the second surface 102. At least one through hole 13 are formed in the circuit substrate 10, each of the at least one through hole 13 penetrates the first surface 101 and the second surface 102. Each of the at least one heat conducting pillar 15 is received in one of the at least one through hole 13 and is connected to the first solder mask 11 and the second solder mask 12. The plurality of heat dissipation fins 20 are arranged on a surface of the first solder mask 11 facing away from the second solder mask 12 for releasing the heat of the circuit board 100.

Referring to FIGS. 2 and 3, the circuit board 100 may be a flexible circuit board, a rigid circuit board or a flexible-rigid circuit board. In at least one embodiment, the circuit board 100 is a rigid circuit board. The plurality of heat dissipation fins 20 are arranged on the surface of the first solder mask 11 facing away from the first surface 101. A heat dissipation channel 21 is formed between any two adjacent heat dissipation fins 20. In at least one embodiment, each of the plurality of heat dissipation fins 20 may be in a shape of a triangular prism, and a width of each of the plurality of heat dissipation fins 20 gradually decreases in a direction away from the first solder mask 11. In at least one embodiment, each of the plurality of heat dissipation fins 20 may be, but not limited to, in a shape of a quadrangular prism, and a width of each of the plurality of heat dissipation fins 20 gradually decreases in a direction away from the first solder mask 11. The heat of the circuit substrate 10 is radiated through the plurality of heat dissipation fins 20. The arrangement of the plurality of heat dissipation fins 20 increases the heat dissipation space and air circulation, thereby increasing the heat transfer area of the circuit board 100.

Referring to FIGS. 2 and 3, the circuit board 10 further includes a plurality of conductive wiring layers 16. A metal layer 14 is formed on an inner surface defining each of the at least one through hole 13 to conduct the plurality of conductive wiring layers 16. Each of the at least one heat conducting pillar 15 is filled in one of the at least one through hole 13 with the metal layer 14. Each of the at least one heat conducting pillar 15 may be a metal pillar made of copper or silver to improve the heat dissipation efficiency of the circuit substrate 10. In at least one embodiment, each of the at least one heat conducting pillar 15 may be made of the same material the first solder mask 11.

Referring to FIGS. 2 and 3, the plurality of heat dissipation fins 20 protrude from the surface of the first solder mask 11 facing away from the second solder mask 12 in a direction away from the second solder mask 12. In at least one embodiment, any two adjacent heat dissipation fins 20 are arranged in parallel, thereby increasing the air circulation in the heat dissipation channel 21. In at least one embodiment, the plurality of heat dissipation fins 20 may be distributed at equal intervals, so that the plurality of heat dissipation fins 20 release heat more evenly. The plurality of heat dissipation fins 20 may be fixedly mounted on the first solder mask 11 or may be integrally formed with the first solder mask 11. In at least one embodiment, the plurality of heat dissipation fins 20 are integrally formed with the first solder mask 11 by the ink.

Figure 4:
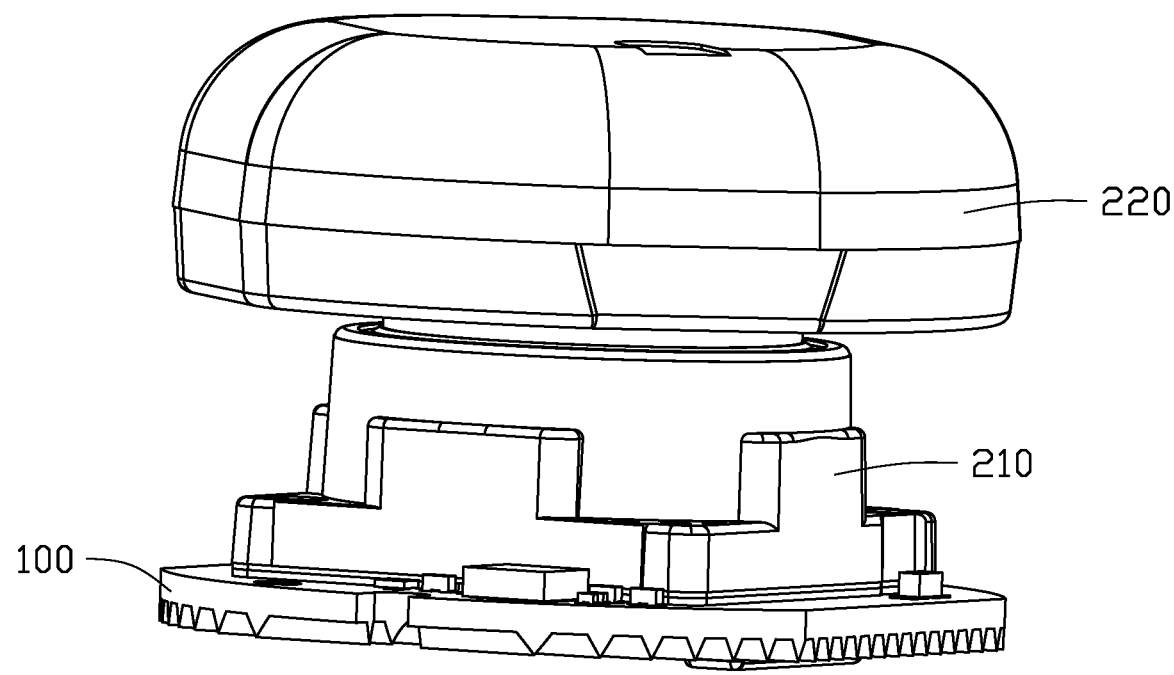
FIG. 4 is a diagram of an embodiment of a camera assembly according to the present disclosure.
Figure 5:
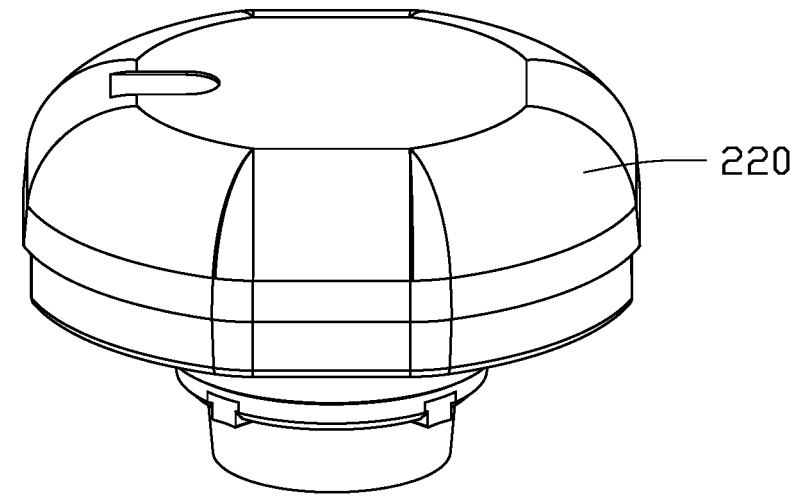
FIG. 5 is an exploded, diagrammatic view of an embodiment of a camera assembly according to the present disclosure.
Figure 5:
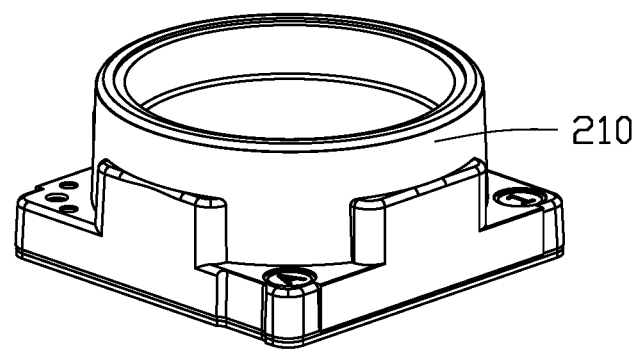
Figure 5:
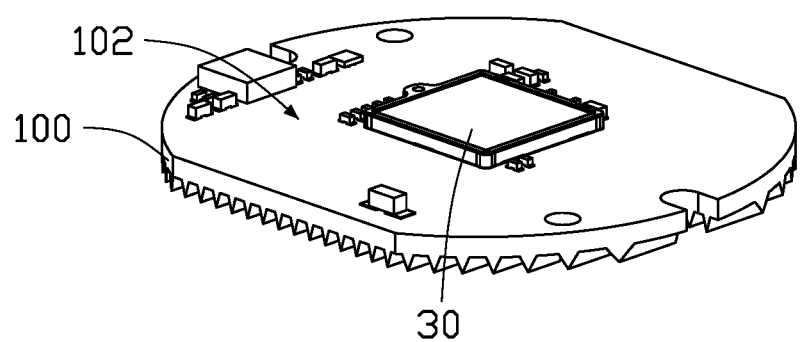
Figure 6:
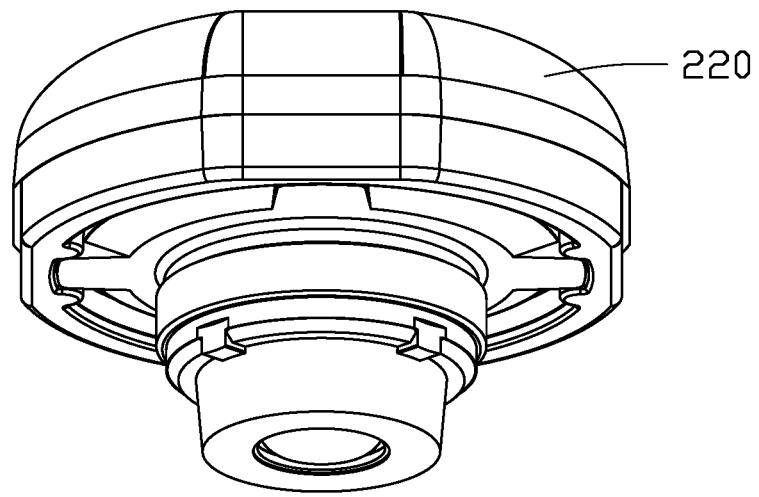
FIG. 6 is another exploded, diagrammatic view of an embodiment of a camera assembly according to the present disclosure.
Figure 6:
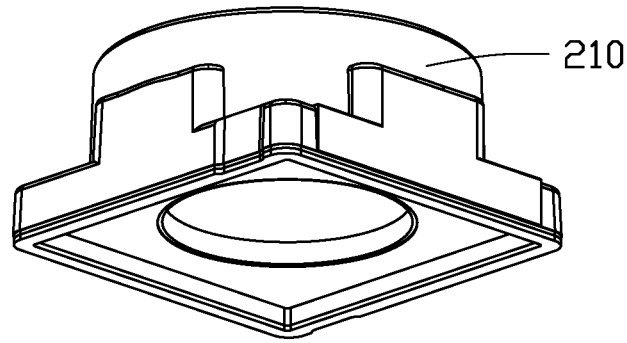
Figure 6:
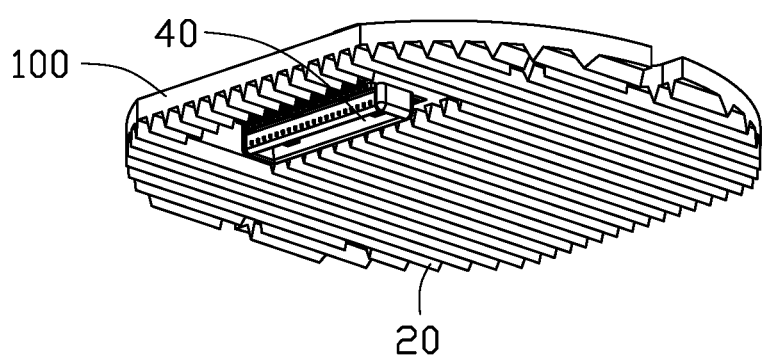

FIG. 4 illustrates an embodiment of a camera assembly 200. Referring to FIGS. 4, 5 and 6, the camera assembly 200 includes the above circuit board 100, a photosensitive chip 30, a lens base 210, and a lens module 220. The photosensitive chip 30 is arranged on the second surface 102 provided with the second solder mask 12. The circuit substrate 10 is located between the photosensitive chip 30 and the first solder mask 11. The photosensitive chip 30 generates heat when it is working. The heat generated by the photosensitive chip 30 is transferred to the first solder mask 11 through the second solder mask 12, the circuit substrate 10 and the at least one conductive pillar 15, then is released to the environment through the plurality of heat dissipation fins 20 and the heat dissipation channel 21. The lens base 210 is arranged on the circuit board 100. The photosensitive chip 30 is received in the lens base 210. The lens module 220 is mounted at a side of the lens base 210 facing away from the circuit board 100.

The camera assembly 200 may further include an electrical connector 40. The electrical connector 40 is arranged on the first surface 101. In at least one embodiment, the electrical connector 40 may be surrounded by the plurality of heat dissipation fins 20. The electrical connector 40 is used to implement signal transmission between the camera assembly 200 and other components of an electronic device 300 (shown in FIG. 7) applying the camera assembly 200. The heat generated by the electrical connector 40 can also be released to the environment through the plurality of heat dissipation fins 20 and the heat dissipation channel 21.

Figure 7:
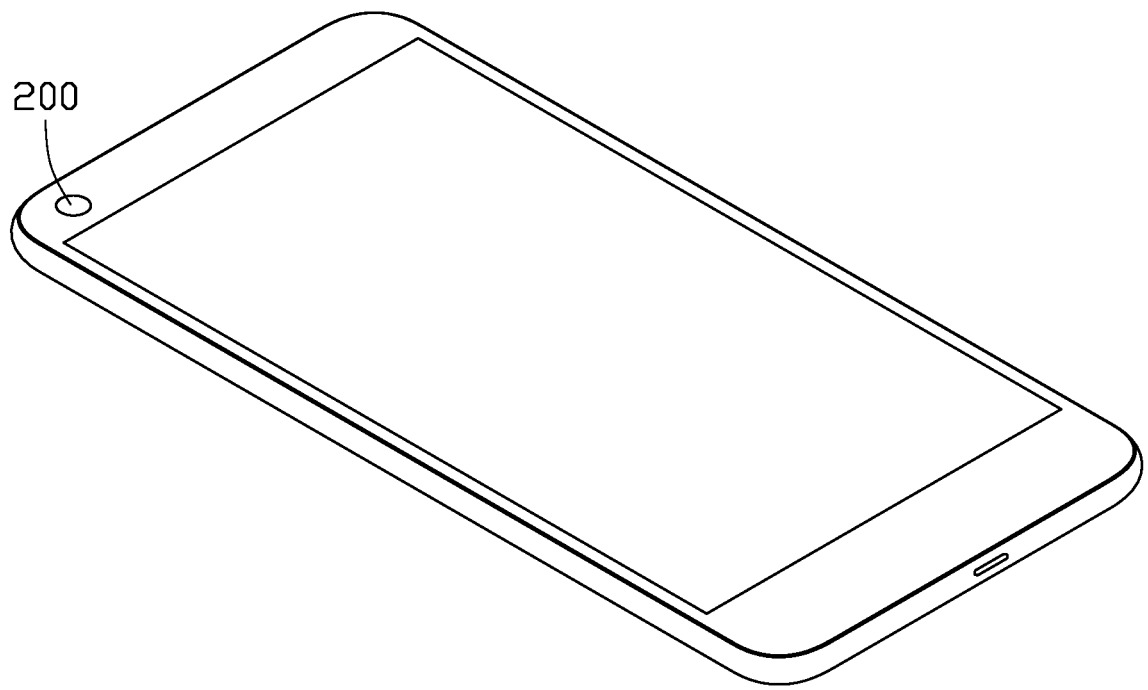
FIG. 7 is a diagram of an embodiment of an electronic device according to the present disclosure.

FIG. 7 illustrates an embodiment of an electronic device 300 including the above camera assembly 200. The electronic device 300 may be, but not limited to, a mobile phone, a wearable device, a computer device, a vehicle or a monitoring device.

The plurality of heat dissipation fins 20 are arranged on the first solder mask 11 of the circuit board 100 and are spaced from each other to increase the contact area between the circuit board 100 and the air, so that the heat dissipation of the circuit board 100 is accelerated, and the heat accumulation on the circuit board 100 is reduced.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A circuit board comprising:
   a circuit substrate comprising a first surface;
   a first solder mask on the first surface;
   a plurality of heat dissipation fins arranged on a surface of the first solder mask facing away from the first surface;
   wherein a heat dissipation channel is formed between any two adjacent of the plurality of heat dissipation fins.

2. The circuit board of claim 1, wherein any two adjacent heat dissipation fins are arranged in parallel.

3. The circuit board of claim 1, wherein the plurality of heat dissipation fins are distributed at equal intervals.

4. The circuit board of claim 1, wherein a width of each of the plurality of heat dissipation fins gradually decreases in a direction away from the first solder mask.

5. The circuit board of claim 4, wherein each of the plurality of heat dissipation fins is in a shape of a triangular prism or a quadrangular prism.

6. The circuit board of claim 1, wherein the plurality of heat dissipation fins are integrally formed with the first solder mask.

7. A camera assembly comprising:
   a circuit board comprising:
      a circuit substrate comprising a first surface;
      a first solder mask on the first surface;
      a plurality of heat dissipation fins arranged on a surface of the first solder mask facing away from the first surface;
      wherein a heat dissipation channel is formed between any two adjacent of the plurality of heat dissipation fins;
   a photosensitive chip on a second surface of the circuit substrate facing away from the first surface;
   a lens base on the second surface of the circuit substrate and covering the photosensitive chip; and
   a lens module at a side of the lens base facing away from the circuit board.

8. The camera assembly of claim 7, wherein any two adjacent heat dissipation fins are arranged in parallel.

9. The camera assembly of claim 7, wherein the plurality of heat dissipation fins are distributed at equal intervals.

10. The camera assembly of claim 7, wherein a width of each of the plurality of heat dissipation fins gradually decreases in a direction away from the first solder mask.

11. The camera assembly of claim 10, wherein each of the plurality of heat dissipation fins is in a shape of a triangular prism or a quadrangular prism.

12. The camera assembly of claim 7, wherein the plurality of heat dissipation fins are integrally formed with the first solder mask.

13. An electronic device comprising:
   a camera assembly comprising:
      a circuit board comprising:
         a circuit substrate comprising a first surface;
         a first solder mask on the first surface;
         a plurality of heat dissipation fins arranged on a surface of the first solder mask facing away from the first surface;
         wherein a heat dissipation channel is formed between any two adjacent of the plurality of heat dissipation fins.

14. The electronic device of claim 13, wherein any two adjacent heat dissipation fins are arranged in parallel.

15. The electronic device of claim 13, wherein the plurality of heat dissipation fins are distributed at equal intervals.

16. The electronic device of claim 13, wherein a width of each of the plurality of heat dissipation fins gradually decreases in a direction away from the first solder mask.

17. The electronic device of claim 16, wherein each of the plurality of heat dissipation fins is in a shape of a triangular prism or a quadrangular prism.

18. The electronic device of claim 13, wherein the plurality of heat dissipation fins are integrally formed with the first solder mask.

* * * * *